United States Patent [19]

Scobie

[11] Patent Number: 4,817,213
[45] Date of Patent: Apr. 4, 1989

[54] METHOD FOR FORMING A TORUS AND A PISTON MADE THEREFROM FOR USE IN A ROTARY ACTUATOR

[75] Inventor: William B. Scobie, Houston, Tex.
[73] Assignee: Keystone International, Inc., Houston, Tex.
[21] Appl. No.: 157,887
[22] Filed: Feb. 19, 1988
[51] Int. Cl.$^4$ .............................................. B22D 11/126
[52] U.S. Cl. .................................... 29/527.6; 82/1.11; 82/12
[58] Field of Search ................... 29/527.6; 82/1 C, 12

[56] References Cited

U.S. PATENT DOCUMENTS 1,342,983  6/1920  Breen ................................. 82/12 X
3,714,703  2/1973  Maples ............................... 82/12 X

FOREIGN PATENT DOCUMENTS 60-172402  9/1985  Japan ..................................... 82/12

Primary Examiner—Carl J. Arbes
Attorney, Agent, or Firm—Browning, Bushman, Zamecki & Anderson

[57] ABSTRACT

A method of forming a finished torus of precise dimension which can be used to form piston segments for use in a rotary actuator in which a torus workpiece is rigidly mounted on a support in such a manner as to leave a first hemi-toroidal surface of the torus workpiece exposed, the support being mounted on a suitable means to rotate the torus workpiece about a fixed axis passing through the center of the torus workpiece, the first hemi-toroidal surface of the torus workpiece being turned with a circular cutting tool by moving the cutting tool in a semi-circular path across the first hemi-toroidal surface of the torus workpiece, then flipping over the torus workpiece and mounting it on the support while leaving a second hemi-toroidal surface of the torus workpiece exposed and once against moving the cutting tool in a semi-circular path across the second hemi-toroidal surface of the torus workpiece while the torus workpiece and support are rotated about the center axis of the torus to thereby produce a finished torus of second, smaller dimension. In forming pistons for use in a rotary actuator, the finished torus is cut into desired segments to form at least one piston segment.

15 Claims, 2 Drawing Sheets

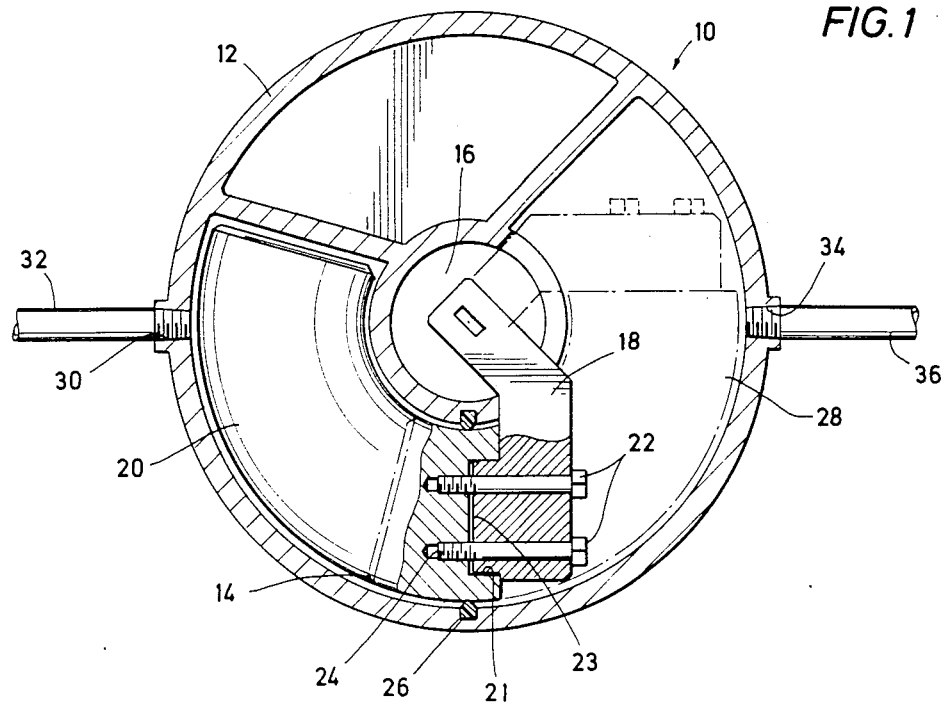
FIG. 1
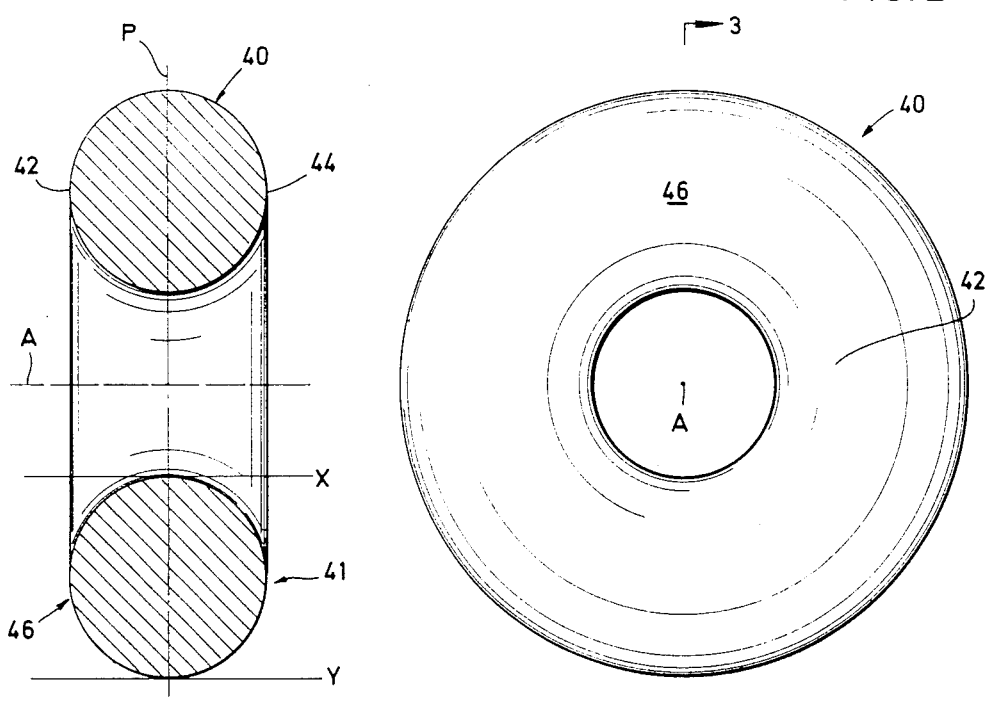
FIG. 2
FIG. 3

METHOD FOR FORMING A TORUS AND A PISTON MADE THEREFROM FOR USE IN A ROTARY ACTUATOR

BACKGROUND OF THE INVENTION

1. Field of the Invention

The present invention relates to the manufacture of a torus and, more particularly, to a method of manufacturing arcuate pistons from said torus for use in rotary actuators.

2. Description of the Prior Art

Rotary actuators are widely used in a variety of applications to rotate a driven member around a fixed axis. For example, rotary actuators are used to open and close valves, turn switches off and on, actuate steering mechanisms, etc. Rotary actuators are more desirable than so called linear actuators in many respects primarily because they are cable of producing greater torque and are more compact and lightweight.

As is well known, a rotary actuator basically comprises a housing which has an arcuate chamber, more specifically, a chamber in the form of a toroidal arc segment and a complimentary shaped arcuate piston which oscillates in the chamber in response to fluid pressure The piston is thus a segment of a torus.

The prior art rotary actuators, despite their efficiency, compactness and lightweight, suffer from a number of drawbacks. For one, it is difficult to provide a durable and efficient seal between the piston and the walls defining the arcuate chamber. As a practical matter, it is virtually impossible to cast a piston or a torus from which the pistons can be cut with the desired dimensions within the desired tolerances such that an effective seal can be achieved between the piston and wall defining the arcuate chamber. While it is possible to machine a roughly cast piston or torus into very close tolerance by the use of complicated and expensive machining apparatus such as a five-axis NC machine, such machining makes the cost of producing the torus or piston prohibitive.

SUMMARY OF THE INVENTION

It is therefor an object of the present invention to provide an improved method of forming a torus of precise dimensions Another object of the present invention is to provide a method for forming an arcuate piston for use in a rotary actuator.

The above and other objects of the present invention will become apparent from the drawings, the description given herein and the appended claims In one aspect of the method of the present invention, a rough torus workpiece is formed e.g by casting, the workpiece being of a given dimension, the torus workpiece being formed from a desired material, ususally metallic in nature. The torus workpiece has a generally cirucular cross-sectional configuration and a first face and second face. The torus workpiece is rigidly mounted on a support so as to leave a first hemi-toroidal surface of the torus workpiece exposed. The support bearing the torus workpiece is then mounted on a suitable means e.g. a lathe, to rotate the torus workpiece in the support about a fixed axis passing through the center of the torus workpiece. The support, carrying the torus workpiece is rotated about the center axis of the torus while simultaneously a desired amount of material is removed by a cutting tool from the exposed first hemi-toroidal surface of the torus workpiece. The cutting tool is indexed adjacent the torus workpiece at a point which lies on a plane passing through the torus workpiece and perpendicular to the center axis of the torus workpiece, the first plane lying equidistant between second and third planes which are also parallel to the center axis of the torus, which pass through the torus and which lie on opposite sides of the first plane, the cutting tool then being moved in a semi-circular path across the first hemi-toroidal surface of the torus workpiece to a second point 180° from the first point. The torus workpiece is then removed from the support, turned over and rigidly mounted on the support so as to leave the second hemi-toroidal surface of the torus workpiece exposed. The support bearing the torus workpiece is then again rotated about the center, fixed axis of the torus workpiece while simultaneously a desired amount of material is removed from the exposed, second hemi-toroidal surface of the torus workpiece. The removal of the material from the second hemi-toroidal surface of the torus workpiece is accomplished in the same manner as the removal of the material from the first hemi-toroidal surface in that the cutting tool is indexed in the same manner and is moved in the same semi-circular path i.e. between the first point and the second point. There is thus produced a finished torus of a predetermined, precise dimension which has been achieved using a relatively simple two-axis NC machine.

In a second aspect of the method of the present invention, the procedure for forming the finished torus, as set out above, is carried out with the addition that the torus is cut so as to provide one, and preferably a plurality of arcuate piston segments which can be used in rotary actuators.

BRIEF DESCRIPTION OF THE DRAWINGS

FIG. 1 is a top view, partly in section, showing a typical rotary actuator employing an arcuate piston made in accordance with the method of the present invention FIG. 2 is a top planar view of a torus workpiece which has been formed by casting or some other suitable forming method.

FIG. 3 is a cross-sectional view taken along the lines of 3—3 of FIG. 2.

DESCRIPTION OF THE PREFERRED EMBODIMENTS

Figure 4:
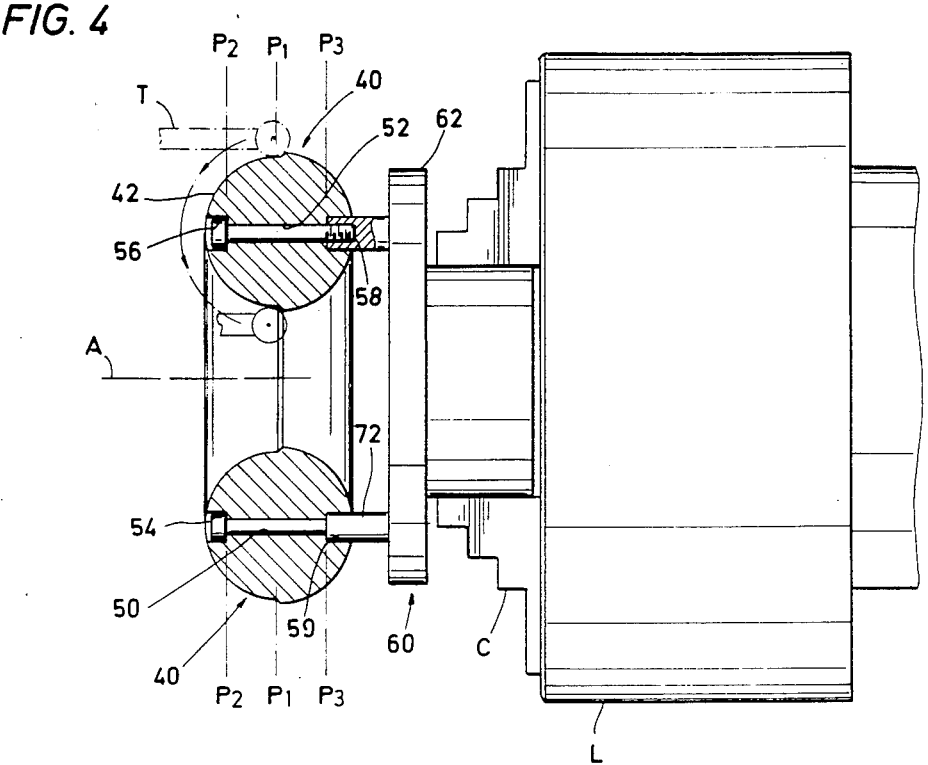
FIG. 4 is an elevational view, partly in section, showing the torus workpiece mounted on a support which is carried by a lathe and shows material being removed from the first hemi-toroidal surface of the torus workpiece.

Referring first to FIG. 1 there is shown a rotary actuator 10 having a wall 12 which, while generally cylindrical in cross-section is of toroidal shape and forms a chamber 14 in the shape of a toroidal arc segment A shaft 16 is rotatably journaled in the housing 12. Attached to the shaft 16 is a piston arm 18, piston arm 18 in turn being secured to a piston 20 by means of bolts 22 received in threaded bores 24 formed in one end face of piston 20. As seen, piston 20 has a socket 21 in which is received a neck portion 23 projecting from piston arm 18. A seal 26 received in an annular groove surrounding chamber 14 provides fluid tight sealing between piston 20 and housing 12 and effectively separates and isolates chamber 14 from a second chamber 28. Chamber 14 is in open communication with a port 30 through which a fluid pressure can be supplied via a conduit 32. Likewise, chamber 28 is in open communication with a port 34 through which fluid pressure can be supplied via a conduit 36.

In operation, and as well known to those skilled in the art, fluid pressure is alternately introduced into chambers 14 and 28 to effect movement of piston 20 from the position shown in full in FIG. 1 to the position shown in phantom in FIG. 1. Oscillation of piston 20 in the chambers 14 and 28 will, of course, result in rotation of shaft 16 which can be suitably connected to a driven member to effect rotation of the driven member.

As can be seen from FIG. 1, the piston 20 is in the form or shape of a toroidal arc segment i.e. a segment removed from a torus by cutting the torus at two circumferencially displaced positions. While the piston is shown as being secured to the piston arm 18 by means of bolts 22 and a pin and socket arrangement, it will be apparent that the piston can be secured to piston arm 18 by a variety of methods and the method of securing the piston 20 to the arm 18 forms no part of the invention herein.

In forming a finished torus of precise dimensions from which an arcuate piston, such as piston 20, can be made according to the method of the present invention, a torus workpiece, shown as 40 in FIG. 2 generally having a circular cross-sectional configuration, is formed such as by casting or some other suitable forming technique. The torus workpiece 40 has a first face 42 and a second face 44. For purposes herein, the center axis of the torus is shown as A (FIGS. 2 and 3), the center axis A being perpendicular to a plane designated P passing edgewise through the torus workpiece 40 so as to divide the torus workpiece 40 into two hemi-toroidal sections The plane P also serves to divide the torus workpiece 40 into a first hemi-toroidal surface 46 extending around face 42 of the torus workpiece from a point where a tangent X to the surface intersects plane P to a point where a tangent Y intersects plane P and a second hemi-toroidal surface 48 extending around face 44 from a point where the tangent X intersects plane P to a point where the tangent Y interests plane P.

Once the torus workpiece 40 is formed, three holes are formed in torus 40 by drilling, each of the holes extending through the torus 40, the first face 42 and the second face 44, the holes being drilled so as to have their axes generally parallel to the center axis A of the torus workpiece. It will be apparent that the three holes must be symmetric on the faces 42 and 44. More specifically, two of the holes must be symmetric with respect to a plane passing through the third hole and which is perpendicular to the plane P. The spacing of the three holes is generally shown with reference to FIG. 6. The first hole (not shown) and the second hole 50 are closer to one another (see FIG. 6) than either of the first and second holes are to the third hole 52. However, as also can be seen from FIG. 6, the first hole and the second hole 50 are each equidistant from the third hole 52. Each of the first, second and third holes is counterbored in the first face 42 to provide counterbore 54 in second hole 50 and counterbore 56 in third hole 52. Likewise, the three holes are counterbored on the second face 44 to provide counterbore 58 in third hole 52, counterbore 59 in second hole 54 and counterbore 61 in the first hole. Though not necessary, the counterbores on the first face 42 are generally equal in depth to the counterbores on the second face 44 of the torus workpiece 40.

Once the torus workpiece 40 has been drilled and counterbored as described above, it is rigidly secured to a support or fixture shown generally as 60. Support 60 has a generally circular, planar flange 62 generally concentrically secured to a neck portion 64 projecting from a first side 66 of flange 62. Projecting from and attached to the other side 68 of flange 62 are three spindles 70, 72 and 74, the three spindles 70, 72 and 74 being positioned so as to be in register with the first, second and third holes in the torus workpiece when the torus workpiece is properly positioned such that one of the faces 42 or 44 is against the three spindles. To rigidly secure the torus workpiece 40 to the fixture 60, bolts 76, 78 and 80 are received through the first, second and third holes, respectively, the bolts being threadedly engaged in threaded bores in the spindles 70, 72 and 74, respectively. It can be seen that the heads of the bolts received in the counterbores in the first, second and third holes engage the bottom of the counterbore thereby tightly securing the torus workpiece 40 to the support 60.

The support 60 is then mounted in the chuck C of a lathe L in the well known manner to enable support 60 and hence the torus workpiece 40 to be rotated about the center axis A of the torus workpiece 40.

In cutting the desired amount of material from the torus workpiece 40, which is preferrably done by turning, a cutting tool T having a circular tip with more than 180° of cutting face or edge is employed. The cutting tool T is indexed adjacent the surface of the torus workpiece 40 at a point which lies on the plane $P_1$. The plane $P_1$ is equidistant between a first plane $P_2$ parallel to plane $P_1$ and perpendicular to axis A and a second plane $P_3$ parallel to plane $P_1$ and perpendicular to axis A. As can be seen, planes $P_2$ and $P_3$ pass through the torus workpiece 40 and, in the case shown in FIG. 4, are generally coincident with the bottom of the first and second counterbores, respectively. In indexing the tool T to start at the proper point and end at the proper point, since the thickness of the workpiece and the distance between the planes $P_2$ and $P_3$ is known and since the relation of the tool T to the support 60 is known, a zero point can be established and the two-axis NC machine programmed to move the tool T from the zero point, in the semi-circular path shown in FIG. 4, i.e. in a semi-circular path from a first point (tool T shown in phantom in FIG. 4) which intersects the plane $P_1$ at the surface of the torus workpiece across the exposed first hemi-toroidal surface 46 of the torus workpiece 40 to a second point which aslo intersects plane $P_1$ and which is 180° (tool T shown in full in FIG. 4) from the first point, the desired amount of material being removed from the exposed first hemi-toroidal surface of the torus workpiece during the turning operation.

Figure 5:
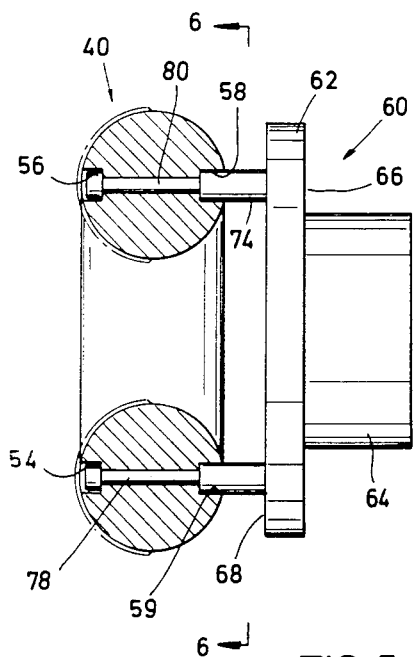
FIG. 5 shows the torus workpiece from FIG. 4 flipped over prior to having material removed from the second hemi-toroidal surface of the torus workpiece.

To complete the machining of the torus workpiece, the torus workpiece 40 is flipped over (see FIG. 5) and the turning process repeated such that the cutting tool T moves in a semi-circular path from the first position of the tool T shown in phantom in FIG. 4 across the second hemi-toroidal surface 48 of the torus workpiece 40 to the second point shown by the tool T in full line thereby again removing a desired amount of material from the exposed, second hemi-toroidal surface of the torus workpiece to produce a finished torus of a second, smaller dimension than the torus workpiece, the finished torus being of precise, predetermined dimension.

Figure 6:
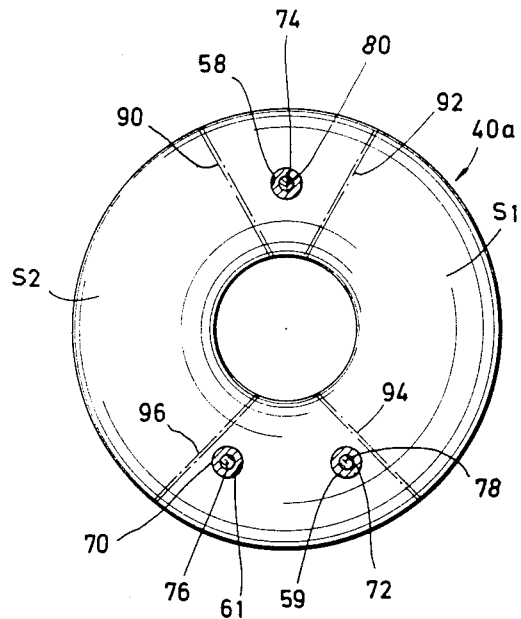
FIG. 6 is a top planar view showing how the finished torus is cut to produce two arcuate pistons

The above described method produces a torus of a predetermined, precise dimension using only a two-axis NC machine. To produce an arcuate piston of the desired, precise dimension, a torus would be formed as described above, the torus then being cut into segments of desired circumferential length. With reference to FIG. 6, it can be seen that a finished torus 40A can be cut into two arcuate piston segments $S_1$ and $S_2$ by making saw cuts as shown at 90, 92, 94 and 96. While as shown, two arcuate piston segments $S_1$ and $S_2$ are produced, it will be apparent that, depending upon the arc length of the arcuate pistons, more piston segments can be obtained from the finished torus 40A.

Using the method of the present invention, a precisely formed torus and hence piston segments made therefrom can be formed without the necessity of using extremely complicated machining techniques such as, for example, a five-axis NC machine. Thus a relatively simple X,Y axis NC machine can be employed simplifying the machining operation and the time involve in forming the finished torus.

The foregoing disclosure and desciption of the invention is illustrative and explanatory thereof, and various changes in the method steps may be made within the scope of the appended claims without departing from the spirit of the invention.

What is claimed is:

1. A method for forming a finished torus comprising:
    forming a torus workpiece of a given dimension from a desired material, said torus workpiece having a generally circular cross-sectional configuration, a first face and a second face;
    rigidly mounting said torus workpiece on a support while leaving a first hemi-toroidal surface of said torus workpiece exposed;
    mounting said support on means to rotate said torus workpiece and said support about a fixed axis passing through the center of said torus workpiece;
    indexing a cutting tool adjacent said torus workpiece at a first point which lies on a first plane passing through said torus work-piece perpendicular to said axis, said first plane equidistant between a second parallel plane passing through said torus workpiece perpendicular to said axis and spaced in a first direction from said first plane and a third parallel plane passing through said torus workpiece perpendicular to said axis and spaced in a second, opposite direction from said first plane;
    rotating said support and said torus workpiece around said axis while moving said cutting tool in contact with said torus workpiece in a semi-circular path from said first point across said exposed, first hemi-toroidal surface of said torus workpiece to a second point 180° from said first point to thereby remove a desired amount of material from said exposed first hemi-toroidal surface of said torus workpiece;
    removing said torus workpiece from said support;
    rigidly mounting said torus workpiece on said support while leaving the second hemi-toroidal surface of said torus workpiece exposed;
    indexing said cutting tool adjacent said torus workpiece at said first point;
    rotating said support and said torus workpiece around said axis while moving said cutting tool in contact with said torus workpiece in a semi-circular path from said first point across said second, hemi-toroidal surface of said torus workpiece to said second point thereby removing a desired amount of material from said exposed, second hemi-toroidal surface of said torus workpiece to thereby produce a finished torus of a second, smaller dimension.

2. The method of claim 1 including forming first, second and third holes through said torus workpiece, said holes having a hole axis generally parallel to said fixed axis, each of said holes extending through said first face and said second face, each of said holes having a first counterbore formed in said first face and a second counterbore formed in said second face.

3. The method of claim 2 wherein said first and second holes are closer to one another than either of said first and second holes is to said third hole.

4. The method claim 1 wherein said first hole is equidistant from said third hole and said second hole is equidistant from said third hole.

5. The method of claim 3 wherein said torus workpiece is mounted on said support by passing threaded bolts from one of said first or second faces of said torus workpiece through said holes and threadedly engaging spindles attached to said support, said spindles being received in said counterbores in said second or first faces of said torus workpiece.

6. The method of claim 1 wherein said torus workpiece is formed by casting.

7. The method of claim 1 wherein said material is removed from said torus workpiece by turning.

8. A method for forming a piston member for use in a rotary actuator comprising:
    forming a torus workpiece of a given dimension from a desired material, said torus workpiece having a generally circular cross-sectional configuration, a first face and a second face;
    rigidly mounting said torus workpiece on a support while leaving a first hemi-toroidal surface of said torus workpiece exposed;
    mounting said support on means to rotate said torus workpiece and said support about a fixed axis passing through the center of said torus workpiece:
    indexing a cutting tool adjacent said torus workpiece at a first point which lies on a first plane passing through said torus workpiece perpendicular to said axis, said first plane equidistant between a second parallel plane passing through said torus workpiece perpendicular to said axis and spaced in a first direction from said first plane and a third parallel plane passing through said torus workpiece perpendicular to said axis and spaced in a second, opposite direction from said first plane;
    rotating said support and said torus workpiece around said axis while moving said cutting tool in contact with said torus workpiece in a semi-circular path from said first point across said exposed, first hemi-toroidal surface of said torus workpiece to a second point 180° from said first point to thereby remove a desired amount of material from said exposed first hemi-toroidal surface of said torus workpiece:
    removing said torus workpiece from said support;

rigidly mounting said torus workpiece on said support while leaving the second hemi-toroidal surface of said torus workpiece exposed;

indexing said cutting tool adjacent said torus workpiece at said first point;

rotating said support and said torus workpiece around said axis while moving said cutting tool in contact with said torus workpiece in a semi-circular path from said first point across said second, hemi-toroidal surface of said torus workpiece to said second point thereby removing a desired amount of material from said exposed, second hemi-toroidal surface of said torus workpiece to thereby produce a finished torus of a second, smaller dimension; and cutting said finished torus into desired segments to form at least one arcuate piston member.

9. The method of claim 8 including forming first, second and third holes through said torus workpiece, said holes having a hole axis generally parallel to said fixed axis, each of said holes extending through said first face and said second face, each of said holes having a first counterbore formed in said first face and a second counterbore formed in said second face.

10. The method of claim 9 wherein said first and second holes are closer to one another than either of said first and second holes is to said third hole.

11. The method claim 9 wherein said first hole is equidistant from said third hole and said second hole is equidistant from said third hole.

12. The method of claim 9 wherein said torus workpiece is mounted on said support by passing threaded bolts from one of said first or second faces of said torus workpiece through said holes and threadedly engaging spindles attached to said support, said spindles being received in said counterbores in said second or first faces of said torus workpiece.

13. The method of claim 8 wherein said torus workpiece is formed by casting.

14. The method of claim 8 wherein said material is removed from said torus workpiece by turning.

15. The method of claim 8 wherein said finished torus is cut so as to provide first and second piston members, said first and second piston members comprising a first segment of said finished torus lying between said first hole and said third hole and a second segment of said finished torus lying between said second hole and said third hole, respectively.

* * * * *